United States Patent
Chiu et al.

(10) Patent No.: US 11,372,861 B2
(45) Date of Patent: Jun. 28, 2022

(54) STREAMS RUNTIME PROCESSING RATE ADJUSTMENT

(71) Applicant: International Business Machines Corporation, Armonk, NY (US)

(72) Inventors: Henry Chiu, San Jose, CA (US); Jingdong Sun, Rochester, MN (US); Bradley William Fawcett, Byron, MN (US); Jason A. Nikolai, Rochester, MN (US); Paul Gerver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/923,523

(22) Filed: Jul. 8, 2020

(65) Prior Publication Data
US 2022/0012248 A1     Jan. 13, 2022

(51) Int. Cl.
| G06F 17/30   | (2006.01) |
| G06F 16/2455 | (2019.01) |
| G06F 16/242  | (2019.01) |
| G06F 16/22   | (2019.01) |
| G06F 16/28   | (2019.01) |

(52) U.S. Cl.
CPC .... *G06F 16/24568* (2019.01); *G06F 16/2282* (2019.01); *G06F 16/2445* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 10,216,793 B2    | 2/2019  | Ji et al.   |              |
| 10,606,711 B2    | 3/2020  | Bishop et al. |            |
| 2011/0016469 A1* | 1/2011  | Klein       | H04L 47/12   |
|                  |         |             | 718/100      |
| 2013/0031556 A1* | 1/2013  | Branson     | G06F 9/4887  |
|                  |         |             | 718/103      |

(Continued)

FOREIGN PATENT DOCUMENTS

CN     107623639 A    1/2018

OTHER PUBLICATIONS

Anonymous, "Grouped Database Operations on a Streaming Environment," An IP.com Prior Art Database Technical Disclosure, IP.com No. IPCOM000259686D, Sep. 6, 2019, 4 pages.

(Continued)

*Primary Examiner* — Hung D Le
(74) *Attorney, Agent, or Firm* — Nolan M. Lawrence (57) ABSTRACT

A stream of tuples is monitored. The stream of tuples is to be processed by a plurality of processing elements of a stream application that operate on one or more compute nodes, each processing element having one or more stream operators. A processing rate of a first stream operator of the stream application is calculated. The processing rate is based on the number of tuples that are processed by the first stream operator. It is determined that the processing rate of the first stream operator meets a predetermined tuple processing criterion. The processing rate of the first stream operator is adjusted based on the predetermined tuple processing criterion.

20 Claims, 4 Drawing Sheets

(56) References Cited

U.S. PATENT DOCUMENTS

| | | | |
|---|---|---|---|
| 2014/0059212 A1* | 2/2014 | Gedik | G06F 9/5066 |
| | | | 709/224 |
| 2014/0136724 A1* | 5/2014 | Branson | H04L 65/4084 |
| | | | 709/231 |
| 2018/0074657 A1* | 3/2018 | Barsness | G06F 16/00 |
| 2018/0077073 A1* | 3/2018 | Barsness | H04L 65/80 |
| 2020/0034468 A1 | 1/2020 | Lei et al. | |

OTHER PUBLICATIONS

Anonymous, "Optimized Migration of a Stream," An IP.com Prior Art Database Technical Disclosure, IP.com No. IPCOM000244000D, Nov. 4, 2015, 4 pages.

Anonymous, "Streams: Dynamic Operator Highlighting in a Streaming Environment," An IP.com Prior Art Database Technical Disclosure, IP.com No. IPCOM000245483D, Mar. 11, 2016, 3 pages.

Babu et al., "Continuous Queries over Data Stream," SIGMOD Record, 2001, 12 pages.

Olston et al., "Adaptive Filters for Continuous Queries over Distributed Data Streams," Technical Report, Stanford InfoLab, 2002, pp. 1-20.

Viglas et al., "Rate-Based Query Optimization for Streaming Information Sources," SIGMOD '2002, Jun. 2002, 13 pages, ACM.

Wei et al., "QoS Management of Real-Time Data Streams Queries in Distributed Environments," Tenth IEEE International Symposium on Object-Oriented Real-Time Distributed Computing (ISORC 2007), 8 pages.

Zhu et al., "Dynamic Plan Migration for Continuous Queries Over Data Streams," SIGMOD 2004, Jun. 2004, 12 pages, ACM.

* cited by examiner

STREAMS RUNTIME PROCESSING RATE ADJUSTMENT

BACKGROUND

The present disclosure relates to stream computing, and more specifically, to adjusting the processing rate of a stream application based on a criterion.

Stream computing may be utilized to provide real-time analytic processing to large quantities of data. Stream computing may be based on a precompiled fixed set of processing elements or stream operators.

SUMMARY

According to embodiments, disclosed are a method, system, and computer program product for processing streams of tuples.

A stream of tuples may be monitored. The stream of tuples is to be processed by a plurality of processing elements of a stream application that operate on one or more compute nodes, each processing element having one or more stream operators. A processing rate of a first stream operator of the stream application is calculated. The processing rate is based on the number of tuples that are processed by the first stream operator. It is determined that the processing rate of the first stream operator meets a predetermined tuple processing criterion. The processing rate of the first stream operator is adjusted based on the predetermined tuple processing criterion.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, more particular aspects relate to adjusting the processing rate of a stream application based on a criterion. While the present disclosure is not necessarily limited to such applications, various aspects of the disclosure may be appreciated through a discussion of various examples using this context.

One of the uses of computing systems (alternatively, computer systems) is to collect available information, manipulate the collected information, and make decisions based on the manipulated information. Computer systems may operate on information through means of databases that allow users to determine what has happened and to make predictions for future results based on past events. These computer systems may receive information from a variety of sources and then record the information into permanent databases. After the information has been recorded in the databases, the computing systems may run algorithms on the information sometimes generating new information and then performing associated transformations on and storing of the new information—to make determinations and provide context to users.

The ability of computer systems to analyze information and provide meaning to users may be insufficient in some situations. The ability of large organizations, such as corporations and governments, to make decisions based on information analysis may be impaired by the limited scope of the information available. In addition, the analysis may be of limited value because it relies on stored structural databases that may contain out-of-date information. This may lead to decisions that are of limited value or, in some cases, inaccurate. For example, a weather forecast service may be unable to accurately predict precipitation for a given region, or a stock brokerage firm may make an incorrect decision regarding a trend in trading of shares.

The analytical shortcomings of computer systems may be compounded by other factors. First, the world may be becoming more instrumented, as previously unintelligent devices are now becoming intelligent devices. Intelligent devices may include devices that have historically been unable to provide analytical information but with the additions of sensors can now do so (e.g., automobiles that are now able to provide diagnostic information to their owners or manufacturers, thermostats that now communicate information about daily temperature fluctuations in homes to users via webpages). Second, these shortcomings may also be compounded by an increase in communication from information sources, as previously isolated devices are now becoming interconnected (e.g., appliances within homes communicate with each other and with power utilities to more efficiently utilize electricity). These new sources of information may provide volumes of not only isolated data points but also relationships between the newly intelligent devices.

A third compounding factor is that users of computing systems may prefer continuous analysis of streams of information, while methods of data acquisition may provide only an event-based approach of analyzing pre-recorded information. For example, an analytics package may receive a finite amount of data and, later, apply analysis to the data. This approach may not work when dealing with a continuous stream of data. A fourth compounding factor is that computer systems may have deficiencies in handling not only the volume of information but also in dealing with the unstructured nature of the information; for example, sensors, cameras, and other new data sources may provide no context or format, just raw information. The analytics methods of computing systems may need to modify and rearrange this data in order to provide any kind of context for the raw information. The modifications and rearrangements may take time or resources that many computing systems may not be able to provide.

Yet another potential drawback is that computing systems may not provide scalable solutions to new users. The advent of smart and connected devices has provided new use-cases for analytics of continuous streams of information. Modern systems of large-scale data collection, however, may require significant user training and provide unintuitive interfaces. For example, a farmer may have each animal on a farm instrumented with sensors to monitor the health and location of the animals. The data from these sensors may enable the farmer to respond to ever-changing health conditions of the animals, but only if the sensor data is collected and transformed into a usable format to provide meaningful information to the farmer in real-time. The farmer may not have the money to provide training and resources to a technical expert to construct a large-scale analytics package, and the obtained information may be left un-used.

Stream-based computing (e.g., within a stream application) may provide users with a way to obtain meaning from extremely large sets of information (big-data). For example, stream computing may be used for scientific research purposes, such as weather forecasting and complex physics modelling. Another example, stream computing may be used for commercial purposes, such as real-time inventory management and stock market tracking. Stream computing may be used for medical purposes, such as analyzing complex and interconnected functions of the human body. Stream computing may be used by end users to more immediately and accurately understand and contextualize large amounts of information.

Stream computing may provide the ability to analyze information as it is captured but before it reaches a final destination (e.g., data from sensors being transmitted to a flat file, records being collected from internet queries and being stored to a database). In some embodiments, stream computing may provide users with the ability to analyze a stream of information that is too large to be captured and placed into a final destination (e.g., sensor values from thousands of sensors that will be discarded after being measured could be utilized by a stream computing application to provide detailed analysis). Stream computing may provide the bandwidth to process big-data continuously and in real-time (e.g., generating context from tens of millions of records per second with low latency from record reception to provide meaningful action in microseconds). Stream computing may provide users with the ability to utilize familiar programmatic conventions to provide context to big-data (e.g., using a structured language to retrieve, format, and conditionally select a subset of information regarding millions of records as those records are generated, using conditional language to trigger an action every few milliseconds based on traditional program statements applied every hundred microseconds).

Information flowing through a stream application may be in the form of streams. A stream may be made up of one or more tuples. A tuple may be a sequence of one or more associated attributes in a relational format. The tuples may share characteristics of a classical relational database (e.g., a single tuple may be similar to a row in a relational database and the attributes of a tuple may be similar to the columns of the row). The tuples may have non-relational database relationships to other tuples of a stream application (e.g., individual values, key-value pairs, flat files, etc.). Tuples may include values in a variety of known computer formats (e.g., integer, float, Boolean, string, etc.). Tuples may contain attributes about themselves, such as metadata. As used herein, a stream, streams, or data stream may refer to a sequence of tuples flowing through a stream application. Generally, a stream may be considered a pseudo-infinite sequence of tuples.

Stream computing may allow users to process big-data and provide advanced metrics upon that big-data continuously as it is being generated by a variety of sources. A stream application may provide stream computing by generating a configuration of one or more processing elements, each processing element containing one or more stream operators. For example, a stream application may be compiled with a fixed logic contained in each processing element and/or stream operator. Each processing element and/or stream operator of the stream application may process big-data by generating and modifying information in the form of tuples. Each tuple may have one or more attributes (e.g., the tuples may be analogous to rows and the attributes analogous to columns in a table).

The stream application may deploy an instance of the configuration to a set of hardware compute nodes. The stream application may then administer the instance by adjusting the hardware to perform the stream application as it is configured, such as by load balancing the processing elements onto compute nodes, onto a portion of a given compute node, or across multiple compute nodes.

In some situations, a stream application may be largely a static big-data operating mechanism. Such a stream application, once configured, may not be changeable in the context it provides to a user. Further, in some situation, such a stream application performs certain logic in how it processes tuples. This logic, once configured, may not be updatable or changeable until a new stream application is compiled. Trying to provide an update to a processing element or stream operator of such a configured stream instance may be impractical because of the real-time continuous nature of stream applications and the information stream applications process. For example, any down-time, even in microseconds, may cause the stream application to not collect one or more tuples during the changeover from an originally configured processing element to an updated processing element. Missing a portion of the data may result in a partial or complete failure of the stream application and the stream application may be unable to provide users with context to big-data sources.

Another problem can occur when too much or too little data is flowing through a stream application. For example, the logic in a given stream operator may provide for a stream application that processes only a subset, selection, or portion of tuples. If too few tuples are processed based on the configuration of a stream operator, poor analytical value may result because the dataset is too small to derive meaning. To compensate, a precompiled stream application may be configured to ingest and process many tuples. If too many tuples are processed based on the configuration of a stream operator, there may be bottlenecks in the system (e.g., processor or memory starvation). In other instances, one or more tuples may be dropped because a portion of the stream application is overwhelmed (e.g., one or more compute nodes may not process certain tuples when a large number of tuples are received). For example, when too much data (too many tuples) floods the stream application random tuples may be dropped, or the system becomes backed up and crashes.

A stream application may leverage runtime processing rate adjustments (RPRA) to provide one or more benefits of streams computing. RPRA may operate by adjusting a filter statement of one or more components of a stream application. The stream application may be precompiled or compiled before runtime. The configuration of the stream application may be largely static. A component of a stream application that leverages RPRA may be dynamically configured after runtime (e.g., reconfigurable after a stream application is compiled and begins execution and processing of tuples). For example, a stream operator may have one or more dynamic configurations that are modifiable after compilation and during execution and runtime of the stream application. RPRA may alter the configuration of a stream application component that is reconfigurable based on a tuple processing rate of the stream application. For example, the RPRA may adjust a filter statement that selects a subset of the tuples that are received by a stream operator. The adjustment of the filter statement may cause the stream operator to select more tuples or fewer tuples to be processed.

The selection of more tuples may increase the accuracy of the stream application. For example, an RPRA may cause a stream application to process a higher percentage of tuples. The higher percentage of captured, ingested, and processed tuples may enable the stream application to provide more accurate or more detailed analysis of a dataset.

The selection of fewer tuples may increase the resiliency of the stream application. A stream application may receive an overwhelming number of tuples (alternatively, stream congestion) for processing in a short amount of time. For example, a processing element that has a single stream operator may receive 10,000 tuples every five minutes during normal processing volume. The precompiled configuration may include a filter statement that ingests 85% of the received tuples. Continuing the example, during a hotspot or busy period, the processing element may receive 30,000 tuples every minute. The RPRA may adjust the filter statement to ingest only 35% of the received tuples.

A RPRA may allow for quicker development, compilation, and deployment of a stream application. For example, when configuring a stream application, the type of data to be ingested and processed by a given stream operator may not be known by a developer. A developer may create an initial configuration that may be compiled for the stream application. The initial configuration may be based on estimation of the type of tuple values that are to be measured. The initial configuration may be based on the anticipated load or number of tuples to be processed. The ARPA may allow for an adjustment to the type of tuple values or the load after compilation. For example, by allowing for a filter statement of a stream operator to be adjusted after runtime.

Figure 1:
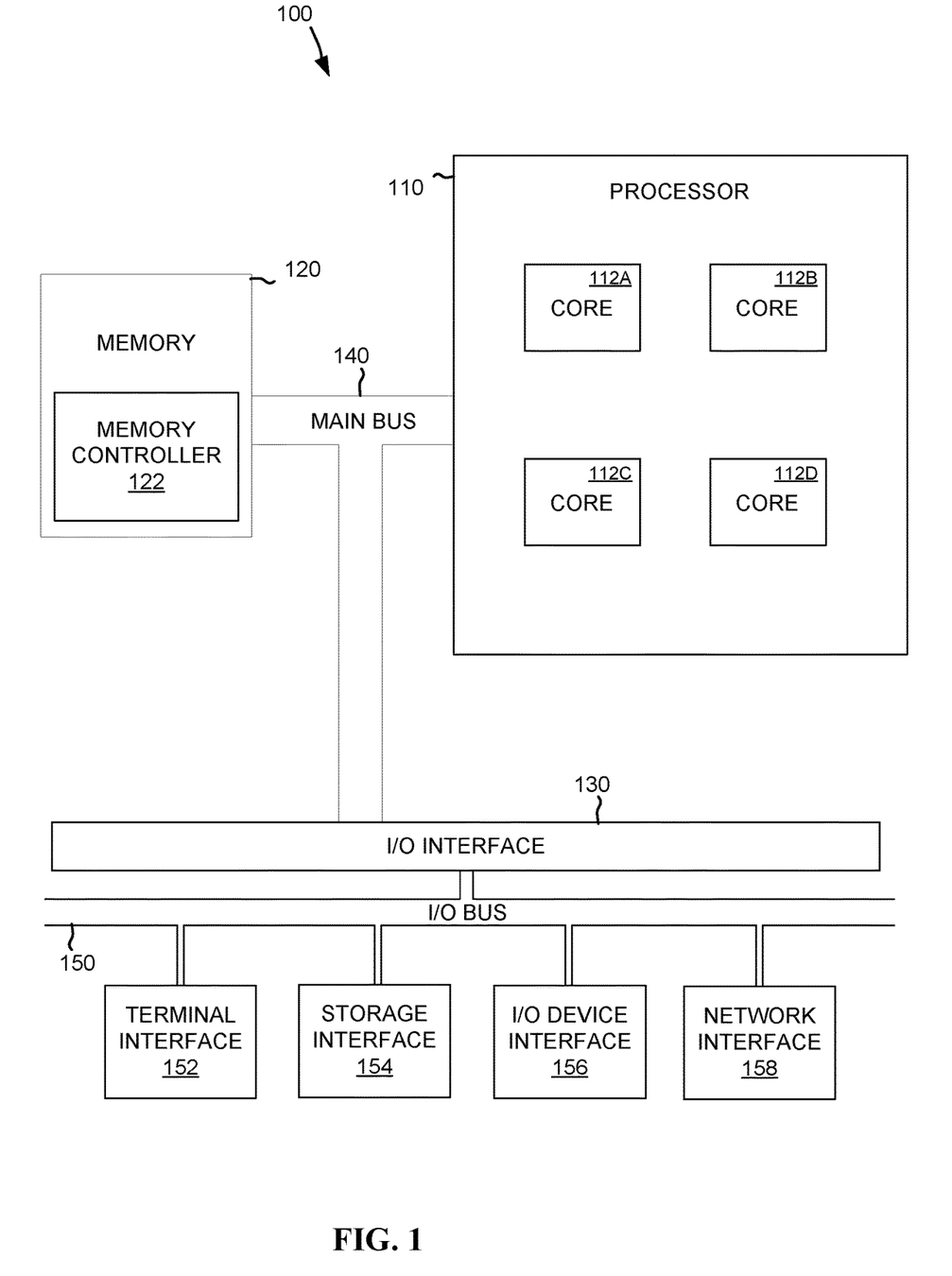
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with some embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In some embodiments that combine or rearrange elements, aspects and capabilities of the logic modules may be combined or redistributed. These variations would be apparent to one skilled in the art.

Figure 2:
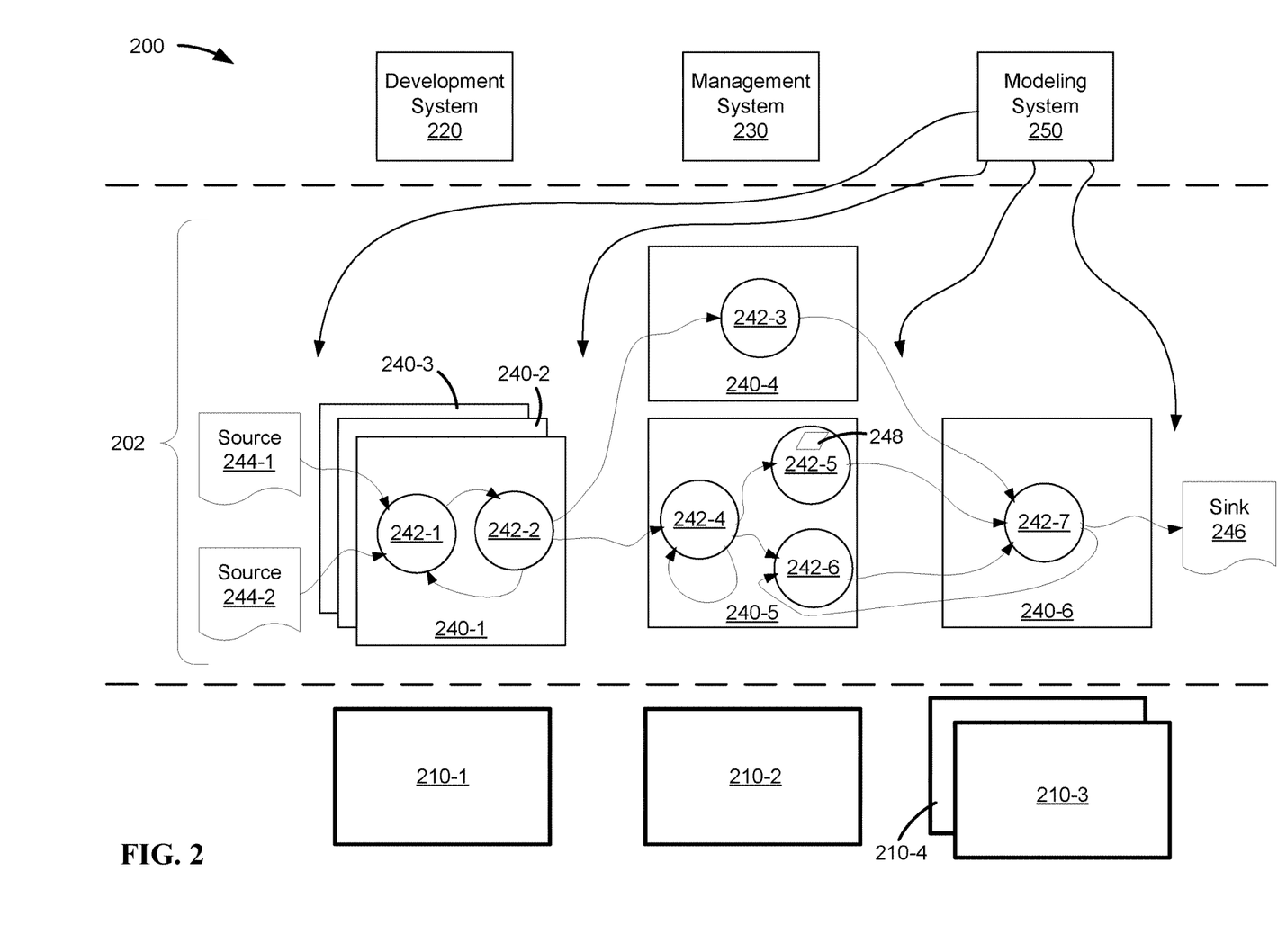
FIG. 2 depicts a stream computing application operating with runtime processing rate adjustments (RPRA) consistent with some embodiments of the present disclosure.

FIG. 2 depicts a stream computing application (stream application) 200 operating with RPRA consistent with some embodiments of the present disclosure. The stream application 200 may be represented in the form of an operator graph 202. The operator graph 202 may visually represent to a user the flow of data through the stream application 200. The operator graph 202 may define how tuples are routed through the various components of the stream application 200 (e.g., an execution path, a precompiled logical layout of processing and resource allocation). The stream application 200 may include one or more compute nodes 210-1, 210-2, 210-3, and 210-4 (collectively, 210); a development system 220; a management system 230; one or more processing elements 240-1, 240-2, 240-3, 240-4, 240-5, and 240-6 (collectively, 240); and one or more stream operators 242-1, 242-2, 242-3, 242-4, 242-5, 242-6, 242-7 (collectively, 242). The stream application 200 may receive information from one or more sources 244-1 and 244-2 (collectively, 244). For example, source 244-1 may measure meteorological sensor data from a first geography location and source 244-2 may gather similar meteorological sensor data from a second geographic location. The stream application 200 may output information to one or more sinks 246. The stream application 200 may be communicatively coupled to a modeling system 250.

Configuration of the stream application 200, depicted by operator graph 202, is merely an example stream application. Stream applications may vary in the number of compute nodes, processing elements, or stream operators. The stream application may also vary the roles and/or responsibilities performed by any of the components or may include other components not depicted. For example, some or all of the functionality of the development system 220 may be performed by the management system 230. In another example, the functionalities of the development system 220 and the management system 230 may be performed by a singular administrative system (not depicted). The administrative system may be configured to perform these tasks without deviation from the embodiments disclosed herein. In yet another example, the functionalities of the development system 220 and the management system 230 may be performed by a plurality of services (e.g., ten or more individual software programs each configured to perform a specific function).

The compute nodes 210 may be computer systems and may each include the following components: a processor, a memory, and an input/output interface (herein I/O). Each compute node 210 may also include an operating system or a hypervisor. In some embodiments, the compute nodes 210 may perform operations for the development system 220, the management system 230, the processing elements 240, and/or the stream operators 242. The compute nodes 210 may be categorized as management hosts, application hosts, or mixed-use hosts. A management host may perform operations for the development system 220 and/or the management system 230. An application host may perform operations for the processing elements 240 and stream operators 242. A mixed-use host may perform operations of both a management host and an application host. FIG. 1 depicts a computer system 100 that may be a compute node consistent with some embodiments.

A network (not depicted) may commutatively couple each of the nodes 210 together (e.g., a local area network, the Internet, etc.). For example, node 210-1 may communicate with nodes 210-2, 210-3, and 210-4 through the network. The computes nodes 210 may communicate with the network by way of the I/O. The network may include a variety of physical communication channels or links. The links may be wired, wireless, optical, or any other suitable media. The network may include a variety of network hardware and software for performing routing, switching, and other functions, such as routers, switches, or bridges. The nodes 210 may communicate through a variety of protocols (e.g., the internet protocol, the transmission control protocol, the file transfer protocol, the hypertext transfer protocol, etc.). In some embodiments, the nodes 210 may share the network with other hardware, software, or services (not depicted).

The development system 220 may provide a user with the ability to create a stream application that is targeted to process specific sets of data. The development system 220 may operate on an instance of a computer system (not depicted), such as the computer system 100. The development system 220 may operate on one or more of the compute nodes 210. The development system 220 may generate one or more configuration files that describes the stream computing application 200 (e.g., the processing elements 240, the stream operators 242, the sources 244, the sinks 246, the assignment of the aforementioned compute nodes 210, etc.). The development system 220 may receive requests from a user to generate the stream application 200. The development system 220 may receive requests from a user to generate other stream applications (not depicted). The development system 220 may communicate with the management system 230 to pass along the configuration on any stream applications it creates.

The development system 220 may generate the configuration by considering the performance characteristics of the software components (e.g., the processing elements 240, the stream operators 242, etc.) the hardware (e.g., the compute nodes 210, the network) and the data (e.g. the sources 244, the format of the tuples, etc.). In a first example, the development system 220 may determine that the overhead of running processing elements 240-1, 240-2, and 240-3 together on compute node 210-1 results in better performance than running them on separate compute nodes. The performance may be better because of a latency incurred by running processing elements 240-1, 240-2, and 240-3 across the network between compute nodes 210-1 and 210-2. In a second example, the development system 220 may determine that the memory footprint of placing stream operators 242-3, 242-4, 242-5, and 242-6 into a single processing element 240-5 is larger than the cache of a first processor in compute node 220B. To preserve memory space inside the cache of the first processor the development system 220 may decide to place only the stream operators 242-4, 242-5, and 242-6 into a single processing element 240-5 despite the inter-process communication latency of having two processing elements 240-4 and 240-5.

In a third example of considering the performance characteristics, the development system 220 may identify a first operation (e.g., an operation being performed on processing element 240-6 on compute node 210-3) that requires a larger amount of resources within the stream application 200. The development system 220 may assign a larger amount of resources (e.g., operating the processing element 240-6 on compute node 210-4 in addition to compute node 210-3) to aid the performance of the first operation. The development system 220 may identify a second operation (e.g., an operation being performed on processing element 240-1) that requires a smaller amount of resources within the stream application 200. The development system 220 may further determine that the stream application 200 may operate more efficiently through an increase in parallelization (e.g., more instances of processing element 240-1). The development system 220 may create multiple instances of processing element 240-1 (e.g., processing elements 240-2 and 240-3). The development system 220 may then assign processing elements 240-1, 240-2, and 240-3 to a single resource (e.g., compute node 210-1). Lastly, the development system 220 may identify a third operation and fourth operation (e.g., operations being performed on processing elements 240-4 and 240-5) that each require low levels of resources. The development system 220 may assign a smaller amount of resources to the two different operations (e.g., having them share the resources of compute node 210-2 rather than each operation being performed on its own compute node).

The development system 220 may include a compiler (not depicted) that compiles modules (e.g., processing elements 240, stream operators 242, etc.). The modules may be source code or other programmatic statements. The modules may be in the form of requests from a stream processing language (e.g., a computing language containing declarative statements allowing a user to state a specific subset from information formatted in a specific manner). The compiler may translate the modules into an object code (e.g., a machine code targeted to the specific instruction set architecture of the compute nodes 210). The compiler may translate the modules into an intermediary form (e.g., a virtual machine code). The compiler may be a just-in-time compiler that executes as part of an interpreter. In some embodiments, the compiler may be an optimizing compiler. In some embodiments, the compiler may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The management system 230 may monitor and administer the stream application 200. The management system 230 may operate on an instance of a computer system (not depicted), such as computer system 100. The management system 230 may operate on one or more of the compute nodes 210. The management system 230 may also provide the operator graph 202 of the stream application 200. The management system 230 may host the services that make up the stream application 200 (e.g., services that monitor the health of the compute nodes 210, the performance of the processing elements 240 and stream operators 242, etc.). The management system 230 may receive requests from users (e.g., requests to authenticate and authorize users of the stream application 210, requests to view the information generated by the stream application, requests to view the operator graph 202, etc.).

The management system 230 may provide a user with the ability to create multiple instances of the stream application 200 configured by the development system 220. For example, if a second instance of the stream application 200 is required to perform the same processing, then the management system 230 may allocate a second set of compute nodes (not depicted) for performance of the second instance of the stream application. The management system 230 may also reassign the compute nodes 210 to relieve bottlenecks in the system. For example, as shown, processing elements 240-4 and 240-5 are executed by compute node 210-2. Processing element 240-6 is executed by compute nodes 210-3 and 210-4. In one situation, the stream application 200 may experience performance issues because processing elements 240-4 and 240-5 are not providing tuples to processing element 240-6 before processing element 240-6 enters an idle state. The management system 230 may detect these performance issues and may reassign resources from compute node 210-4 to execute a portion or all of processing element 240-4, thereby reducing the workload on compute node 210-2. The management system 230 may also perform operations of the operating systems of the compute nodes 210, such as the load balancing and resource allocation of the processing elements 240 and stream operators 242. By performing operations of the operating systems, the management system 230 may enable the stream application 200 to more efficiently use the available hardware resources and increase performance (e.g., by lowering the overhead of the operating systems and multiprocessing hardware of the compute nodes 210).

The processing elements 240 may perform the operations of the stream application 200. Each of the processing elements 240 may operate on one or more of the compute nodes 210. In some embodiments, a given processing element 240 may operate on a subset of a given compute node 210, such as a processor or a single core of processor of a compute node 210. In some embodiments, a given processing element 240 may correspond to an operating system process of an operating system hosted by a compute node 210. In some embodiments, a given processing element 240 may operate on multiple compute nodes 210. The processing elements 240 may be generated by the development system 220. Each of the processing elements 240 may be in the form of a binary file and additionally library files (e.g., an executable file and associated libraries, a package file containing executable code and associate resources, etc.).

Each of processing elements 240 may include configuration information from the development system 220 or the management system 230 (e.g., the resources and conventions required by the relevant compute node 210 to which it has been assigned, the identity and credentials necessary to communicate with the sources 244 or sinks 246, the identity and credentials necessary to communicate with other processing elements, etc.). Each of the processing elements 240 may be configured by the development system 220 to run optimally upon one of the compute nodes 210. For example, processing elements 240-1, 240-2, and 240-3 may be compiled to run with optimizations recognized by an operating system running on compute node 210-1. The processing elements 240-1, 240-2, and 240-3 may also be optimized for the particular hardware of compute node 210-1 (e.g., instruction set architecture, configured resources such as memory and processor, etc.).

Each of processing elements 240 may include one or more stream operators 242 that perform basic functions of the stream application 200. As streams of tuples flow through the processing elements 240, as directed by the operator graph 202, they pass from one stream operator to another. Multiple stream operators 242 within the same processing element 240 may benefit from architectural efficiencies (e.g., reduced cache missed, shared variables and logic, reduced memory swapping, etc.). The processing elements 240 and the stream operators 242 may utilize inter-process communication (e.g., network sockets, shared memory, message queues, message passing, semaphores, etc.). The processing elements 240 and the stream operators 242 may utilize different inter-process communication techniques depending on the configuration of the stream application 200. For example: stream operator 242-1 may use a semaphore to communicate with stream operator 242-2; processing element 240-1 may use a message que to communicate with processing element 240-3; and processing element 240-2 may use a network socket to communicate with processing element 240-4.

The stream operators 242 may perform the basic logic and operations of the stream application 200 (e.g., processing tuples and passing processed tuples to other components of the stream application, excluding from processing or processing tuples based on a precompiled filter statement). One or more of the stream operators 242 may operate based on RPRA. For example, stream operator 242-5 may include an updateable filter statement 248. Updateable filter statement 248 may include one or more conditions for processing tuples. The conditions may be changed, after execution of the compiled stream application beings, to filter out or select to process more or less tuples. By separating the logic that may occur within a single larger program into basic operations performed by the stream operators 242, the stream application 200 may provide greater scalability. For example, tens of compute nodes hosting hundreds of stream operators in a stream application may enable processing of millions of tuples per second. The logic may be created by the development system 220 before runtime of the stream application 200. In some embodiments, the sources 244 and the sinks 246 may also be stream operators 242. In some embodiments, the sources 244 and the sinks 246 may link multiple stream applications together (e.g., the sources 244 could be sinks for a second stream application and the sinks 246 could be sources for a third stream application). The stream operators 242 may be configured by the development system 220 to optimally perform the stream application 200 using the available compute nodes 210. The stream operators 242 may send and receive tuples from other stream operators. The stream operators 242 may receive tuples from the sources 244 and may send tuples to the sink 246.

The stream operators 242 may perform operations (e.g., conditional logic, iterative looping structures, type conversions, string formatting, filter statements, etc.) upon the attributes of a tuple. In some embodiments, each stream operator 242 may perform only a very simple operation and may pass the updated tuple on to another stream operator in the stream application 200—simple stream operators may be more scalable and easier to parallelize. For example, stream operator 242-2 may receive a date value to a specific precision and may round the date value to a lower precision and pass the altered date value to stream operator 242-4 that may change the altered date value from a 24-hour format to a 12-hour format. A given stream operator 242 may not change anything about a tuple. The stream operators 242 may perform operations upon a tuple by adding new attributes or removing existing attributes.

The stream operators 242 may perform operations upon a stream of tuples by routing some tuples to a first stream operator and other tuples to a second stream operator (e.g., stream operator 242-2 sends some tuples to stream operator 242-3 and other tuples to stream operator 242-4). The stream operators 242 may perform operations upon a stream of tuples by filtering some tuples (e.g., culling some tuples and passing on a subset of the stream to another stream operator). The stream operators 242 may also perform operations upon a stream of tuples by routing some of the stream to itself (e.g., stream operator 242-4 may perform a simple arithmetic operation and as part of its operation it may perform a logical loop and direct a subset of tuples to itself). In some embodiments, a particular tuple output by a stream operator 242 or processing element 240 may not be considered to be the same tuple as a corresponding input tuple even if the input tuple is not changed by the stream operator or the processing element.

The stream application 200 may be communicatively coupled to a modeling system 250. The modeling system 250 may analyze the operation of a stream application over time to determine one or more adjustments to one or more filter statements of stream operators of the stream application 200. For example, modeling system 250 may be configured to analyze data at various portions of the operator graph. The various portions may be modeling for the processing rate of the streaming application 200 (e.g., the number of tuples input to stream operator 242-2, the amount of tuples output from source 244-1). The various portions may be modeled for the processing rate of the streaming rate of the stream application 200 over a given period of time (e.g., hours, days).

The modeling system 250 may be configured to determine longer-term trends than can a stream application. For example, each stream operator 242 that is configured with RPRA may be configured to cache, read, or otherwise analyze a subset of recent tuples and tuple sets that have been processed. A subset of recent tuples may be stored in a cache (e.g., 500 kilobytes, 64 kilobytes) that a stream operator 242 has access to. The subset of recent tuples may be tuples processed in the last fifteen minutes, the last 350 tuples, or another relatively small number of tuples. As the modeling system 250 operates on a separate computer system, such as computer 100 of FIG. 1, the modeling system 250 may have access to or operate with many times larger amounts of memory. For example, the modeling system 250 may operate and generate a model of the data that is processed throughout the operator graph 202. The model may include a summary of the stream of tuples. For example, the modeling system 250 may generate a model that includes the sources of data, the types or formats of data, one or more representative values of the data, the times of day or hour that tuples are received, and other similar information regarding the data of a stream application.

The modeling system 250 may make or generate one or more criteria (e.g., thresholds, ranges, percentage of system congestion, number of tuples being lost during times of congestion) based on modeling the operation of a stream application over hours, days, or longer. The modeling system 250 may generate a criterion for processing of tuples based on already viewing, consuming or otherwise modeling the data of the stream application, such as hundreds of thousands of tuples. The modeling system 250 may also generate a representative model of historical data (e.g., the type and number of tuples that have a certain value, the number of tuples seen across various times of day). The modeling system may use the historical data to determine updated filter statements for one or more of the stream operators. For example, a filter statement may normally include data that matches one of fifty-five distinct values. Tuples that flow through a stream application may generally include tuples that match only twenty-five of the values. Moreover, the tuples that flow through the stream application may, as a majority, only match three or four values; actionable data can be determined from twelve or thirteen rarely occurring values. The modeling system may generate an updated filter statement that filters out the majority of tuples (e.g., filtering out or removing 90% of the tuples that contain the three or four values) but preserves the rarely occurring tuples that contain the twelve or thirteen values. In another example, a statistical sample of the incoming data may be used as a representation of the historical data universe which in many applications will provide an adequate data sample for the application to properly analyze the data set. The historical data may then be used to filter out generally or often occurring values, or to filter out a majority of the often-occurring values.

In some embodiments, modeling system 250 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 3A:
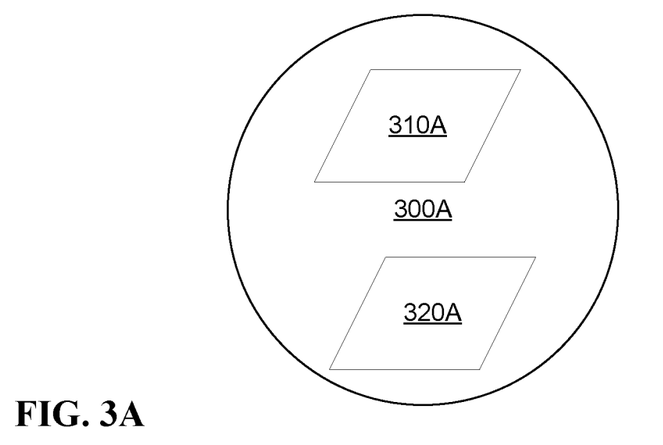
FIG. 3A depicts an example stream operator with an adjustable filter statement consistent with some embodiments of the disclosure.
Figure 3B:
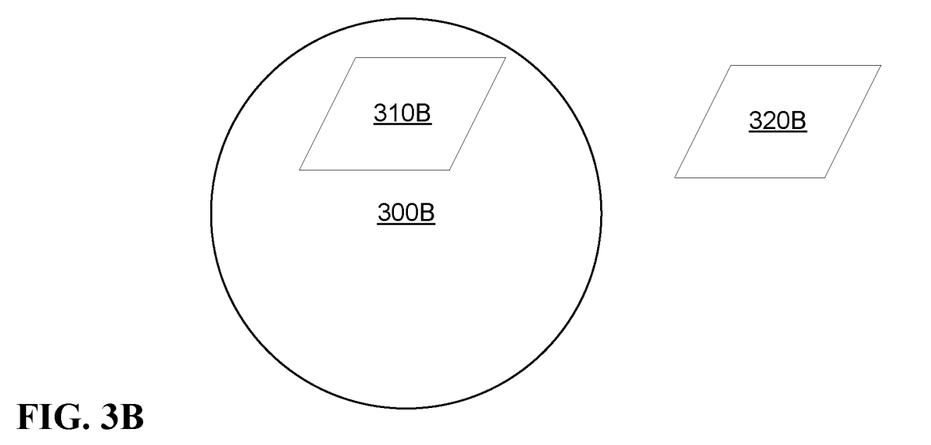
FIG. 3B depicts an example stream operator with an adjustable filter statement consistent with some embodiments of the disclosure.
Figure 3C:
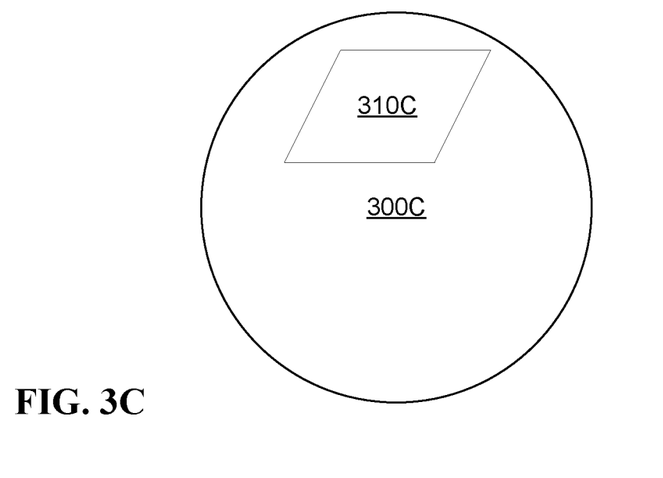
FIG. 3C depicts an example stream operator without an adjustable filter statement consistent with some embodiments of the disclosure.

FIG. 3A, FIG. 3B, and FIG. 3C each depict examples of a stream operator 300A, 300B, 300C (collectively, 300). The stream operator 300 may be a portion of a stream application. For example, stream operator 300 may depict stream operator 242-3 of operator graph 202. In another example, stream operator 300 may depict stream operator 242-1 of operator graph 202. The stream operator 300 may be a filter operator. For example, stream operator 300 may be configured to remove tuples from a stream of tuples by passing along only those tuples that satisfy a filter statement or other condition. By leveraging RPRA, the previously static filter condition may be expanded or contracted to reach a desired output tuple rate when predefined congestion rates, specified by one or more stream application variable, are hit. Congestion rate measurement are currently available in the streams runtime engine.

The stream operator 300 may be a join operator. For example, stream operator 300 may be configured to correlate tuples from two streams of tuples that are based on match condition (e.g., a type of filter statement). By leveraging RPRA, the stream operator 300 can keep track of recent tuple data and change the matching condition so that more or less tuples are produced as a result of a join by the join operator. The stream operator 300 may be an import operator. For example, stream operator 300 may be configured to receives tuples from streams that are made available by export operators of other stream applications or from hardware sensors configured to output tuples. Import streams can be matched to export streams using subscription conditions (e.g., a type of filter statement). Stream operator 300 may operate as an import operator with a subscription by optionally specifying a filter statement to filter tuples from the export operator. Because a stream application may be configured earlier and compiled, utilizing a RPRA to adjust the filter statement of an import operator provides flexibility. For example, an import operator of a first stream application may be configured with RPRA of stream operator 300.

The criterion of filtering by stream operator 300 may be adjusted to ingest more of less tuples. The adjustability provided by the RPRA may allow for the compiled stream application to service or ingest tuples from export operators of a variety of stream applications (e.g., stream applications providing relatively few tuples, stream application providing many tuples). The criterion may be a predetermined threshold, such as whether there are over 400 tuples being processed per second. The filter statement may be a range that includes the highest and lowest values. To achieve a desired tuple processing rate, RPRA may alter the criteria of the filter statement or another criterion. The criterion may be a predetermined range, such as whether there are between 100 and 200 tuples that contain a specific value being processed every three minutes.

The stream operator 300 may be configured to operate on numeric data types. For example, a data type may be numeric and stream operator 300 may include a filter statement "filter@conjestion=10%,conjestion=90%: (x>approx(40)||x<approx(60))." The filter statement may be expanded or narrowed to capture additional or fewer tuples, respectively. The range may be expanded to "(x>39||x<61)" from the initial 40 to 60 range. The range may be incrementally expanded or contracted depending on the criterion of the RPRA. For example, the numeric range may be narrowed by 10% initially and the performance or accuracy of the stream application may be reevaluated. Based on the evaluation, the RPRA may again narrow the already narrowed range by an additional 10%.

The stream operator 300 may be configured to operate on textual data types. In another example, a data type may be string based and the stream operator 300 may include a filter statement that is "(x==approx("foo"))." The filter statement may be expanded or contracted depending on one or more criteria. The filter statement may be expanded by appending additional values to the filter statement. For example, the statement that was initially set to "(x==approx("foo"))" may be expanded to "(x=="foo" II x=="bar")." In another example, a filter statement of "(R.name==L.name && department==approx("A"))" can be expanded to "(R.name==L.name && (department=="A" II department=="B"))" when a lower bound on a predetermined congestion rate criterion is achieved.

Multiple conditions may be a part of the filter statement. For example, a filter statement may be "((x=="foo" II X=="bar") && age>approx(55))" for stream operator 300. If a predetermined congestion threshold of 273 tuples per minute is determined, then the RPRA may adjust the filter statement conditions. For example, the filter statement may be constricted to "((x=="foo"||X=="bar") && age>65" for stream operator 300. In another example, the filter statement may be constricted to ""((x=="foo") && age>55"" for stream operator 300. In some embodiments, the filter statement may be narrowed and expanded depending on the operation of a stream application. For example, RPRA may determine that narrowing of a filter statement "((x=="foo"||X=="bar") && age>approx(55))" may not provide representative data. The statement may be narrowed and expanded to be "((x=="foo") && age>48" for the stream operator 300 to capture appropriate data representative of information that is to be characterized by the stream application.

FIG. 3A depicts an example stream operator 300A with an adjustable filter statement consistent with some embodiments of the disclosure. Stream operator 300A may include a non-editable section 310A and an editable section 320A. The stream operator 300A may be compiled into an executable that includes non-editable section 310A. The stream operator 300A may also include an editable filter statement in the editable section 320A, such as a definition file. The stream operator 300A may be stored in a singular location, such as a folder or structure representative of stream operator 300A. The singular location may include the compiled non-editable section 310A and the editable section 320A.

FIG. 3B depicts an example stream operator 300B with an adjustable filter statement consistent with some embodiments of the disclosure. Stream operator 300B may include a non-editable section 310B and an editable section 320B. Stream operator 300B may be compiled into an executable format and may include a defined segment of code such as non-editable section 310B. The non-editable section 310B may include in the code a link to editable section 320B. The link may be a uniform resource location, target description, link, reference, or other relevant indication of editable section 320B. For example, non-editable section 310B may include an include statement that references to a separate definition file with a specific name. Non-editable section 310B may also include a working directory or other defined namespace where related files and libraries, that are used by stream operator 300B, may be located. Editable section 320B may be stored in the working directory and may be stored in the form of a file that conforms to the name of the include statement. Editable section 320B may be in the form of an updateable file (e.g., a text file) that contains a filter statement.

FIG. 3C depicts an example stream operator 300C without an adjustable filter statement consistent with some embodiments of the disclosure. Stream operator 300C may be a compiled or pre-configured code file (e.g., machine code). The stream operator 300C may include a fixed filter statement. For example, stream operator 300C may be configured with non-editable section 310C to operate on one or more tuples of a stream of tuples based on a pre-configured filter statement. The preconfigured filter statement may not be adjusted by the stream operator 300C. A RPRA may still be able to update the filter statement without changing the configuration of stream operator 300C. For example, a modeling system, such as modeling system 250, may intercept a stream of tuples before they are processed by stream operator 300C. The modeling system may be configured to modify the number of tuples that are then passed on or released to the stream operator 300C. The modeling system may modify the number of tuples by performing a second filtering statement that is more narrowing or distinct than the filter statement of the non-editable section 310C.

Figure 4:
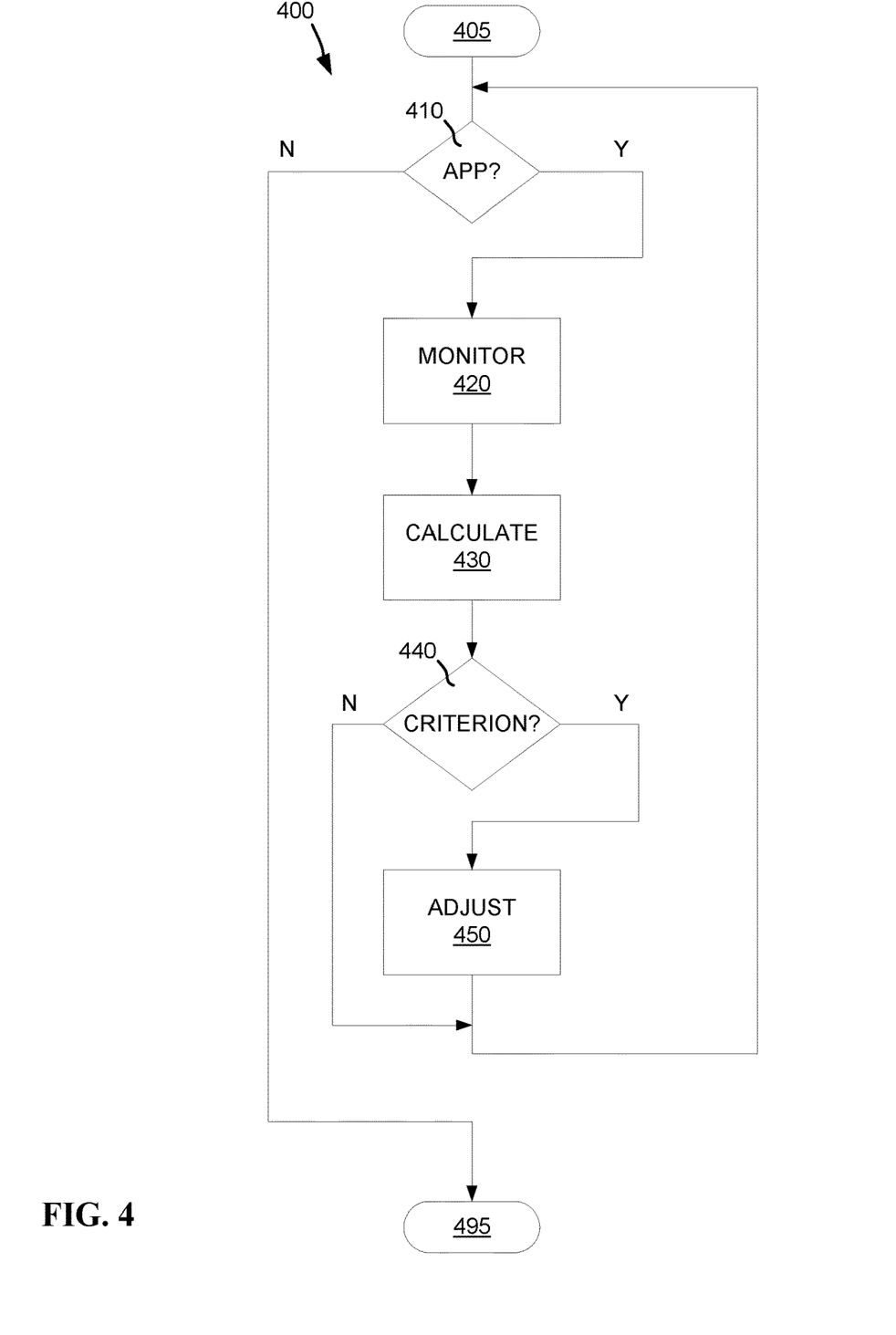
FIG. 4 depicts an example method of performing RPRA consistent with some embodiments of the disclosure.

FIG. 4 depicts an example method 400 of performing RPRA consistent with some embodiments of the disclosure. Method 400 may be performed by a single computer, such as computer system 100. Method 400 may be performed by multiple computers, such as compute nodes 210. Method 400 may be performed by a stream application, such as stream application 200.

From start 405, method 400 may begin by scanning for the presence of a stream application at 410. If there is a stream application active at 410:Y, the stream application may be monitored at 420. For example, modeling system 250 may monitor stream application 200 for the processing of tuples. In some embodiments, the stream application 200 may monitor itself for the processing of tuples. If there is not a stream application executing at 410:N, method 400 may end at 495.

Based on monitoring of the stream application, a processing rate of the stream application may be calculated at 430. For example, a computer system may monitor stream application 200 for the number of tuples that are processed by each of the stream operators 242 over a given time period. In another example, a modeling system 250 may monitor stream application 200 for the number of tuples that include a certain value are processed by the stream operators 242 every ten minutes.

Based on the calculations it may be determined if the processing rate of the processor meets a predetermined tuple processing criterion at 440. For example, the predetermined tuple processing criterion may include a predetermined threshold of processing over 125 tuples that contain the value "blue" per minute. The number of tuples processed with the value of "blue" may be 140 in the last minute would indicate that the predetermined criterion is met. In another example, the predetermined tuple processing criterion may include a predetermined range of values with an upper bound of "12" and a lower bound of "5" for a first attribute of tuples. A given tuple received with a first attribute of "3" would be outside of the range and indicative that the predetermined criterion is met. If the predetermined criterion is met, at 440:Y, the processing rate of the stream application may be adjusted at 450. Adjusting the processing rate of the stream application may include modifying the stream of tuples. For example, a modeling system 250 may filter, remove, or otherwise prevent one or more of the processing elements 240 or stream operators 242 of stream application 200 from processing certain tuples. In another example, one or more conditions of a filter statement of a stream operator may be adjusted to expand or restrict the number or type of tuples to be processed.

After the processing rate of the stream application is adjusted at 450, it may be determined if the stream application is still present at 410. If the stream application is still present, at 410:Y, the method 400 may continue to monitor the stream application at 420. If the stream application is no longer present, at 410:N, then method 400 ends at 495. For example, a stream application 200 may have previously been executing on a stream of tuples, but at 410 it may be determined that the stream application ended processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing streams of tuples, the method comprising:
    monitoring a stream of tuples to be processed by a plurality of processing elements of a stream application that operate on one or more compute nodes, each processing element having one or more stream operators, wherein a filter statement defines one or more conditions for tuples to be processed, and wherein the filter statement is included with at least one stream operator of the one or more stream operators;

calculating a processing rate of a first stream operator of the stream application, the processing rate is based on the number of tuples that are processed by the first stream operator;

determining, based on the filter statement, that the processing rate of the first stream operator meets a predetermined tuple processing criterion; and adjusting, based on the predetermined tuple processing criterion, the processing rate of the first stream operator.

2. The method of claim 1, wherein the processing rate is based on the filter statement that defines one or more conditions for tuples to be processed or not processed by the first stream operator.

3. The method of claim 2, wherein the filter statement is located in a definition file.

4. The method of claim 3, wherein the definition file is located outside of the first stream operator, and wherein the included filter statement includes a hard-coded reference to the definition file.

5. The method of claim 2, wherein adjusting the processing rate comprises modifying the filter statement by updating the one or more conditions the filter statement.

6. The method of claim 5, wherein:
the calculating of the processing rate of the first stream operator of the stream application is at a first time, and the method further comprises:
 calculating a second processing rate of a first stream operator, the second processing rate is based on the number of tuples that are processed by the first stream operator at a second time that occurs after the first time;
 determining that the second processing rate of the first stream operator no longer meets the predetermined tuple processing criterion; and
 adjusting, based on the predetermined tuple processing criterion, the second processing rate of the first stream operator, wherein the adjusting comprises changing the updated one or more conditions of the modified filter statement.

7. The method of claim 2, wherein the filter statement is a compiled portion of the first stream operator, the compiled portion not editable after compilation of the first stream operator.

8. The method of claim 7, wherein:
the adjusting occurs after a compilation of the first stream operator, and
the adjusting further comprises:
 intercepting a subset of tuples of the stream of tuples;
 removing the subset of tuples from the stream of tuples; and
 permitting, after the removing the subset, the stream of tuples other than the subset to pass to the first stream operator.

9. The method of claim 1, wherein:
the predetermined tuple processing criterion is a range of values, and
determining that the processing rate of the first stream operator meets the predetermined tuple processing criterion is determining that the processing rate of the first stream operator is outside the range of values.

10. The method of claim 1, wherein:
the determining the predetermined tuple processing criterion is based on the generated model of the stream of tuples;
the method further comprises:
 capturing, before the monitoring the stream of tuples, the stream of tuples over an extended period of time; and
 generating, based on one or more characteristics of each tuple of the captured stream of tuples, the model of the stream of tuples.

11. A system, the system comprising:
a memory, the memory containing one or more instructions; and
a processor, the processor communicatively coupled to the memory, the processor, in response to reading the one or more instructions, configured to:
 monitor a stream of tuples to be processed by a plurality of processing elements of a stream application that operate on one or more compute nodes, each processing element having one or more stream operators, wherein at least one stream operator of the one or more stream operators includes an editable section and a non-editable section;
 calculate a processing rate of a first stream operator of the stream application, the processing rate is based on the number of tuples that are processed by the first stream operator;
 determine, based on the editable section of the at least one stream operator that the processing rate of the first stream operator meets a predetermined tuple processing criterion; and
 adjust, based on the predetermined tuple processing criterion, the processing rate of the first stream operator.

12. The system of claim 11, wherein the processing rate is based on a filter statement that defines one or more conditions for tuples to be processed or not processed by the first stream operator.

13. The system of claim 12, wherein the filter statement is located in a definition file.

14. The system of claim 13, wherein the definition file is located outside of the non-editable section of the at least one stream operator.

15. The system of claim 11, wherein:
the predetermined tuple processing criterion is range of values, and
determining that the processing rate of the first stream operator meets the predetermined tuple processing criterion is determining that the processing rate of the first stream operator is outside the range of values.

16. A computer program product, the computer program product comprising:
one or more computer readable storage media; and
program instructions collectively stored on the one or more computer readable storage media, the program instructions configured to:
 monitor a stream of tuples to be processed by a plurality of processing elements of a stream application that operate on one or more compute nodes, each processing element having one or more stream operators;
 calculate a processing rate of a first stream operator of the stream application, the processing rate is based on the number of tuples that are processed by the first stream operator;
 determine, based on a filter statement that is compiled into the first stream operation, that the processing rate of the first stream operator meets a predetermined tuple processing criterion; and adjust, based on the predetermined tuple processing criterion, the processing rate of the first stream operator.

17. The computer program product of claim 16, wherein the processing rate is based on the filter statement that defines one or more conditions for tuples to be processed or not processed by the first stream operator.

18. The computer program product of claim 17, wherein adjusting the processing rate comprises modifying the filter statement by updating the one or more conditions the filter statement.

19. The computer program product of claim 18, wherein:

the calculating of the processing rate of the first stream operator of the stream application is at a first time, and the program instructions further configured to:

calculate a second processing rate of a first stream operator, the second processing rate is based on the number of tuples that are processed by the first stream operator at a second time that occurs after the first time;

determine that the second processing rate of the first stream operator no longer meets the predetermined tuple processing criterion; and adjust, based on the predetermined tuple processing criterion, the second processing rate of the first stream operator, wherein the adjusting comprises changing the updated one or more conditions of the modified filter statement.

20. The computer program product of claim 16, wherein:

the determining the predetermined tuple processing criterion is based on the generated model of the stream of tuples, the program instructions further configured to:

capture, before the monitoring the stream of tuples, the stream of tuples over an extended period of time; and generate, based on one or more characteristics of each tuple of the captured stream of tuples, the model of the stream of tuples.

* * * * *